May 25, 1954  N. N. RODERMAN  2,679,229
SPEEDOMETER WITH STOPPING DISTANCE INDICATION
Filed June 5, 1952
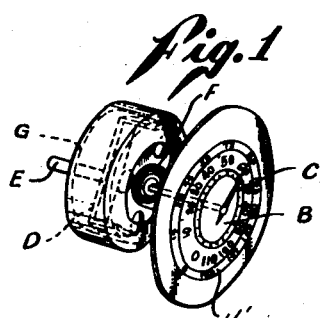
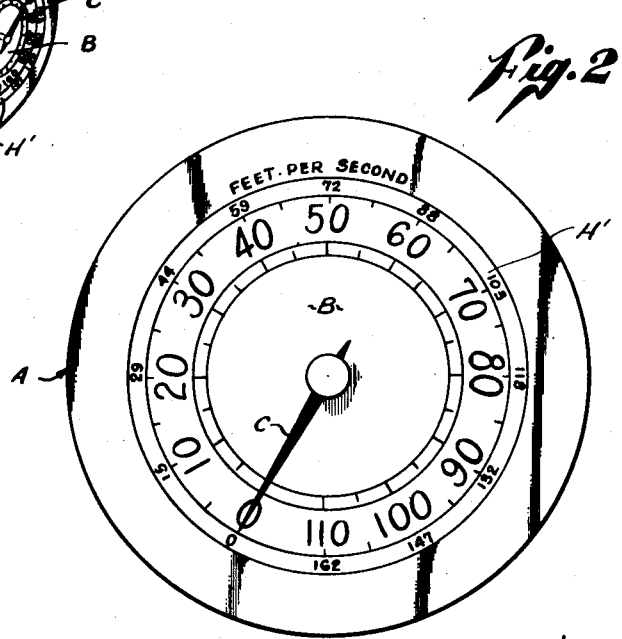
INVENTOR.
NATHANIEL N. RODERMAN
BY
Attorney Patented May 25, 1954

2,679,229

UNITED STATES PATENT OFFICE 2,679,229

SPEEDOMETER WITH STOPPING DISTANCE INDICATION

Nathaniel N. Roderman, Los Angeles, Calif.

Application June 5, 1952, Serial No. 291,838

1 Claim. (Cl. 116—129)

This invention comprehends the provision in a speedometer of generally conventional type of supplemental means for visibly indicating the speed of a vehicle in distances traveled in fractional units of time such, for example, as in feet per second in addition to the conventional miles per hour designations.

To accomplish the desired result in a simple and most economical manner without complicating or encumbering a conventional mechanism, it is an object to provide a secondary dial or indicator in association with the conventional miles per hour indicator and arranged so that preferably one of said indicators will be driven in coordination with, or even directly by the other, as when the driving indicator is drivingly connected with a source of power in a conventional manner.

Due to present day efforts of law enforcing agencies and civic associations to educate and inform automobile drivers of the great necessity for the practise of due caution because of the large numbers of accidents occurring daily, loss of life, injuries to citizens and property, every possible attempt is being made to create a consciousness in automotive drivers of execessive speeds under different conditions. The usual speedometer which indicates speed only in miles per hour, and the distances traveled fail to impress a driver with an appreciation of speed per second or other fractional periods of time. An indicated speed of 30 miles per hour frequently seems too slow to some because they fail to recognize that 30 miles per hour corresponds to 44 feet per second—one third of which period is required for reaction and response to an impulse from the human brain, while only a few feet of progress might mean the difference between safety and death or injury to person and property.

Hence, it is an object to provide in a speedometer in addition to the usual stationary dial scale representing miles per hour, a secondary dial which is either stationary or movable, together with the usual indicator which may be movable over or with respect to both of said dials. In one form the two dials may be coaxial with the rotatable indicator and marked at corresponding points with miles per hour and feet per second designations, respectively, thus as the indicator is swung to register with the indication "30" on the miles per hour dial it will simultaneously register with the indication "44" on the feet per second dial. In another form the secondary or feet per second dial may be secured to the indicator for rotation therewith and relative to the stationary miles per hour dial so that the appropriate feet per second designation will be moved with the indicator into registration with progressively ascending or descending miles per hour designations as the speed of the vehicle is accelerated or decelerated. In all events the corresponding miles per hour and the feet per second designations will be visible to a vehicle operator simultaneously and the feet per second designations would preferably be of a red color so as to attract attention of the operator and influence his driving accordingly.

Other and more detailed objects of invention will appear as the description progresses.

I have shown a speedometer embodying preferred forms of my invention in the accompanying drawing, subject to further modification, within the scope of the appended claim without departing from the spirit of the invention, in which:

Fig. 1 is a perspective view of the speed indicating unit detached from its supporting case and particularly arranged with an auxiliary dial which is marked with numerals representing different rates of speed measured in feet per second and adapted to be driven by the speed cup of a unit together with the indicator;

Fig. 2 is a front view of a conventional speedometer with the speed indications shown thereon in units of miles per hour and corresponding units of feet per second for common registration with the usual indicator to simultaneously indicate the speed in miles per hour and feet per second;

Fig. 3 is a cross sectional view of the speedometer of Fig. 2 equipped with the rotatable auxiliary dial of Fig. 1 when viewed on a diametrical plane of Fig. 2;

Fig. 4 is a face view of the auxiliary dial as viewed rearwardly from the front of the speed cup of Fig. 1; and Fig. 5 is a front view of a speedometer arranged with apertures through which feet per second indications on the otherwise obscured auxiliary dial may be indicated simultaneously with corresponding miles per hour indications.

Briefly described, a conventional speedometer as shown includes a case A with a dial B on the front of the case, a rotatable indicator C movable over said dial, a rotatable magnet D affixed to a shaft E which is adapted for connection through a flexible shaft with a rotating part of the motor or vehicle, and a speed cup G operating as an armature and rotatable by magnetic attraction of said magnet. Indicator C is resiliently connected with and rotated by said speed cup through a sensitive spiral spring F so as to render the indicator highly sensitive to speed variations transmitted from the vehicle or its motor to and through the magnet driven speed cup.

A simple but effective manner of adapting my improvements to a new or used speedometer, as shown in Fig. 1, is to affix an auxiliary dial H to shaft E forwardly of the speed cup G on the front face of which there is provided a circular scale of numerals representing units of distance as in feet per second which are so calibrated and arcuately spaced as to correspond to the calibrations and numerals on dial B representing speed in miles per hour that the movement of indicator C in response to variations of speed will simultaneously indicate rates of speed in units designated on both dials. Thus, in said described form of instrument the auxiliary dial rotates with the indicator, and the numerical designations on said auxiliary dial may be readily observed through an aperture J in dial B as shown in Fig. 5.

An alternate form of instrument could include an annular auxiliary dial H concentric with but adjacent the miles per hour designations on dial B as shown in Fig. 2, in which case the dial H would be suitably connected with speed cup G for rotation with the indicator. Or, the circular scale in units of feet per second may be provided on dial B either inwardly or outwardly of the scale of miles per hour designations and therefore be stationary. In any of said cases the result would be the same, namely, to simultaneously indicate to a vehicle driver the speed of a vehicle in both miles per hour and feet per second or other fractional periods of time or distance.

As shown in Fig. 5 a second aperture J' may be provided on dial B diametrically opposite aperture J through which designations of safe stopping distances marked on dial H, said designations being usually in feet to correspond to different feet per second and miles per hour designations on dials B and H, respectively. To such end the safe stopping distance designations are arranged concentrically with respect to the feet per second designations in a smaller circle than that of the feet per second designations.

Thus, at one glance a driver can visibly note the miles per hour and feet per second speed and also the indicated safe stopping distance at a prevailing speed.

I claim:

A speed indicating device for an automotive vehicle comprising: a casing adapted to be positioned on the dashboard of the vehicle; an indicator rotatably mounted within said casing, said indicator adapted to be connected to a rotating part of the vehicle so as to be rotated thereby; a stationary circular dial disposed within said casing beneath said indicator, said stationary dial being mounted coaxially with said indicator, said stationary dial having a circular scale of graduations on the face thereof for indicating the speed of the vehicle in terms of miles traveled by the vehicle per hour; a rotatable circular dial disposed within said casing behind said stationary dial, said rotatable dial being attached to said indicator so as to be rotated simultaneously therewith, said rotatable dial having a pair of concentric circular scales of designations thereon for indicating the speed of the vehicle in terms of the number of feet traveled by the vehicle per second and the number of feet which would be required to stop the vehicle respectively, said stationary dial having a pair of apertures therein for exposing to view only the designations on said rotatable dial which are disposed beneath said apertures, said stationary dial having legends thereon positioned adjacent said apertures for indicating the nature of the respective designations which are exposed by said apertures, said device being adapted to indicate to the driver of the vehicle simultaneously the speed of the vehicle in terms of miles per hour as indicated by the position of said indicator with respect to said stationary dial and the speed of the vehicle in terms of feet per second and feet required to stop as indicated by the designations on said rotatable dial which are visible through the apertures in said stationary dial.

References Cited in the file of this patent

UNITED STATES PATENTS

| Number | Name | Date |
| --- | --- | --- |
| 1,768,020 | Arnold | June 24, 1930 |
| 1,893,090 | Kreidler | Jan. 3, 1933 |
| 1,942,343 | Melik-Minassintz | Jan. 2, 1934 |
| 2,117,212 | Rodanet | May 10, 1938 |
| 2,175,129 | Ralfson | Oct. 3, 1939 |

FOREIGN PATENTS

| Number | Country | Date |
| --- | --- | --- |
| 521,950 | France | Mar. 17, 1921 |